United States Patent
Xu

(10) Patent No.: US 11,718,272 B2
(45) Date of Patent: Aug. 8, 2023

(54) WINDSCREEN WIPER SMART CONTROL METHOD AND APPARATUS

(71) Applicant: Yu Xu, Jiangsu (CN)

(72) Inventor: Yu Xu, Jiangsu (CN)

(*) Notice: Subject to any disclaimer, the term of this patent is extended or adjusted under 35 U.S.C. 154(b) by 529 days.

(21) Appl. No.: 16/757,392

(22) PCT Filed: Nov. 20, 2018

(86) PCT No.: PCT/CN2018/116326
§ 371 (c)(1),
(2) Date: Apr. 18, 2020

(87) PCT Pub. No.: WO2019/101055
PCT Pub. Date: May 31, 2019

(65) Prior Publication Data
US 2020/0247366 A1   Aug. 6, 2020

(30) Foreign Application Priority Data

Nov. 21, 2017 (CN) .......................... 201711163094.4
Dec. 11, 2017 (CN) .......................... 201711310127.3
(Continued)

(51) Int. Cl.
*B60S 1/08* (2006.01)
*B60R 16/023* (2006.01)

(52) U.S. Cl.
CPC .......... *B60S 1/0896* (2013.01); *B60R 16/023* (2013.01); *B60S 1/0859* (2013.01)

(58) Field of Classification Search
CPC .... B60S 1/0859; B60S 1/0896; B60S 1/0818; B60S 1/0803; B60S 1/08
See application file for complete search history.

(56) References Cited

U.S. PATENT DOCUMENTS

2014/0265980 A1* 9/2014 Kracker ................. G06V 20/56
318/483

FOREIGN PATENT DOCUMENTS

CN   102887131 A   1/2013
CN   103863253 A   6/2014
(Continued)

OTHER PUBLICATIONS

Translation of WO2016055590A1, retrieved from Espaceneton Aug. 3, 2022 (Year: 2016).*
(Continued)

*Primary Examiner* — Thomas Raymond Rodgers
(74) *Attorney, Agent, or Firm* — Wright IP & International Law; Eric G. Wright

(57) ABSTRACT

Provided are a wiper intelligence control method and device. The a wiper intelligence control method includes following steps: an operation state of a wiper is switched to an automatic wiper operation state or a manual wiper operation state according to a received wiper operation state switch signal; when the wiper operates in the automatic wiper operation state, if a wiper movement speed adjustment signal output from a manual operation module is received, a current wiper movement speed is adjusted; when the wiper is switched from the automatic wiper operation state to the manual wiper operation state, the current wiper movement speed of the wiper is locked as the wiper movement speed in the manual wiper operation state; when the wiper operates in the manual wiper operation state, if the wiper movement speed adjustment signal output from the manual operation module is received, the current wiper movement speed is adjusted.

16 Claims, 6 Drawing Sheets

(30) Foreign Application Priority Data

May 23, 2018 (CN) .......................... 201820767240.8
Sep. 30, 2018 (CN) .......................... 201811162162.X

(56) References Cited

FOREIGN PATENT DOCUMENTS

| CN | 103963253 | A | 8/2014 | | |
|---|---|---|---|---|---|
| CN | 104960498 | A | 10/2015 | | |
| CN | 204870908 | U | 12/2015 | | |
| CN | 107792014 | A | 3/2018 | | |
| CN | 107878399 | A | 4/2018 | | |
| CN | 207565540 | U | 7/2018 | | |
| DE | 4109318-02 | * | 9/1993 | ............ | B60S 1/0807 |
| DE | 4417385 | A1 | 11/1995 | | |
| DE | 19755441 | A1 | 6/1999 | | |
| EP | 3204267 | A1 | 8/2017 | | |
| JP | 2014024354 | A | 2/2014 | | |
| KR | 100375378 | B1 | 3/2003 | | |
| WO | 03047928 | A2 | 6/2003 | | |
| WO | 2016055590 | A1 | 4/2016 | | |
| WO | WO-2016055590 | A1 * | 4/2016 | ............ | B60S 1/0818 |

OTHER PUBLICATIONS

Translation of DE4109318A1, retrieved from espacenet on Jan. 19, 2023 (Year: 1993).*
Office Action In Priority Document 201811162162.X (dated Mar. 12, 2020).
Office Action In Priority Document 201811162162.X (dated Jun. 27, 2019).
International Search Report, PCT/CN2018/116326, ISA/CN (dated Feb. 13, 2019).
Examination Report, 202027016233, IPI (dated Feb. 24, 2021).
Extended European Search Report, 18881145.9-1015/3715191, PCT/CN2018116326, EPO (dated Jul. 8, 2021).

* cited by examiner

WINDSCREEN WIPER SMART CONTROL METHOD AND APPARATUS

CROSS-REFERENCE TO RELATED APPLICATIONS

The present disclosure is a national stage application under 35 U.S.C. 371 based on application PCT/CN2018/116326, which claims priority to a Chinese patent application No. 201811162162.X filed on Sep. 30, 2018, a Chinese patent application No. 201711163094.4 filed on Nov. 21, 2017, a Chinese patent application No. 201711310127.3 filed on Dec. 11, 2017, and a Chinese patent application No. 201820767240.8 filed on May 23, 2018, contents of all of which are incorporated herein by reference in their entireties.

INCORPORATION BY REFERENCE

This US national stage entry application of PCT Application PCT/CN2018/116326 titled "Windscreen Wiper Smart Control Method And Apparatus" filed Nov. 20, 2018, incorporates by reference each of CN 201711163094.4 titled "Action induction motor vehicle windshield wiper control device and control method thereof" filed Nov. 21, 2017, CN 201711310127.3 titled "Control device and control method for manually adjusting automatic rain-sensing wiper of motor vehicle" filed Dec. 11, 2017, CN 201820767240.8 filed May 23, 2018 and CN 201811162162.X filed Sep. 30, 2018 in their entirety respectively.

TECHNICAL FIELD

The present disclosure relates to the technical field of wiper control and, for example, to a wiper intelligence control method and device.

BACKGROUND

A wiper is a necessary electrical device of a vehicle and is used for assisting a driver of the vehicle to obtain a better observation field of view during driving, so that the driving safety is better guaranteed. There are two categories of wipers installed on the vehicle: one is a manual wiper, the other is an automatic wiper. The manual wiper is usually provided with six operation gears: 1-stop, 2-inching, 3-intermission, 4-slow, 5-fast and 6-cleaning. The automatic wiper utilizes a rainfall sensor to implement automatic wiper.

A gear switch operation of the manual wiper is implemented by manually toggling a mechanical electrical switch by the driver of the vehicle. The automatic wiper senses an intensity of precipitation outside the vehicle through the rainfall sensor, and automatically adjusts a wiper movement speed through a wiper controller.

However, for the manual wiper, the six operation gears are too few in use, and cannot meet requirements of different drivers. For the automatic wiper, due to individual differences of different drivers, the requirements on the wiper movement speed are different under the condition of the same intensity of precipitation. Even for the same driver, under the condition of different time or different physical conditions, the requirements on the wiper movement speed may be different for the same intensity for precipitation. However, the wiper movement speed of the automatic wiper is merely controlled by the intensity of precipitation, so that the individual requirements of different drivers cannot be met. Therefore, the manual wiper and the automatic wiper have poor flexibility.

SUMMARY

The present disclosure provides a wiper intelligence control method and device, to improve the flexibility of wipers.

The present disclosure provides a wiper intelligence control method. The method comprises steps described below.

An operation state of a wiper is switched to an automatic wiper operation state or a manual wiper operation state according to a received wiper operation state switch signal. The automatic wiper operation state refers to that a wiper movement speed of the wiper automatically changes with change of an intensity of precipitation sensed by a rainfall sensor. The manual wiper operation state refers to that the wiper movement speed of the wiper stays unchanged once adjusted, and does not change with the change of the intensity of precipitation.

When the wiper operates in the automatic wiper operation state, if a wiper movement speed adjustment signal output from a manual operation module is received, a current wiper movement speed is adjusted according to the wiper movement speed adjustment signal.

When the wiper is switched from the automatic wiper operation state to the manual wiper operation state, the current wiper movement speed of the wiper is locked as the wiper movement speed in the manual wiper operation state.

When the wiper operates in the manual wiper operation state, if the wiper movement speed adjustment signal output from the manual operation module is received, the current wiper movement speed is adjusted according to the wiper movement speed adjustment signal.

In an embodiment, when the wiper operates in the automatic wiper operation state, after the current wiper movement speed is adjusted according to the wiper movement speed adjustment signal, the method further includes a following step: a correspondence between the adjusted wiper movement speed and the intensity of precipitation at a moment of receiving the wiper movement speed adjustment signal is used as a reference to subsequently adjust a plurality of wiper movement speeds corresponding to different intensities of precipitation.

In an embodiment, the wiper movement speed adjustment signal is used for instructing the wiper movement speed to be adjusted up or down.

The step in which the current wiper movement speed is adjusted according to the wiper movement speed adjustment signal comprises steps described below.

If the wiper movement speed adjustment signal instructs the wiper movement speed to be adjusted up, a wiper motor rotation speed corresponding to the current wiper movement speed is increased by a speed variation corresponding to a default speed adjustment resolution; If the wiper movement speed adjustment signal instructs the wiper movement speed to be adjusted down, the wiper motor rotation speed corresponding to the current wiper movement speed is decreased by the speed variation corresponding to the default speed adjustment resolution. The default speed adjustment resolution is a default speed variation of the wiper motor rotation speed.

In an embodiment, the wiper movement speed adjustment signal is used for instructing the wiper movement speed to be adjusted up or down.

Before the current wiper movement speed is adjusted according to the wiper movement speed adjustment signal, the method further comprises a following step: a speed adjustment resolution setting signal output form the manual operation module is received, and a speed adjustment resolution is set according to the speed adjustment resolution setting signal. The speed adjustment resolution is a speed variation of a wiper motor rotation speed.

The step in which the current wiper movement speed is adjusted according to the wiper movement speed adjustment signal includes following steps: if the wiper movement speed adjustment signal instructs the wiper movement speed to be adjusted up, a wiper motor rotation speed corresponding to the current wiper movement speed is increased by a speed variation corresponding to the set speed adjustment resolution; if the wiper movement speed adjustment signal instructs the wiper movement speed to be adjusted down, the wiper motor rotation speed corresponding to the current wiper movement speed is decreased by the speed variation corresponding to the set speed adjustment resolution.

The present disclosure further provides a wiper intelligence control device. The wiper intelligence control device includes a manual operation module and a microprocessor. The manual operation module is connected to the microprocessor. The manual operation module is configured to output a wiper operation state switch signal to the microprocessor. The manual operation module is further configured to output a wiper movement speed adjustment signal to the microprocessor. The microprocessor is configured to be connected to a rainfall sensor and a wiper device. The microprocessor is further configured to preform following operations: an operation state of a wiper is switched to an automatic wiper operation state or a manual wiper operation state according to the wiper operation state switch signal output from the manual operation module; when the wiper operates in the automatic wiper operation state, a wiper movement speed corresponding to an intensity of precipitation sensed by the rainfall sensor in real time is calculated according to a preconfigured correspondence between the intensity of precipitation and a wiper movement speed, a wiper movement speed control signal corresponding to the wiper movement speed is output to the wiper device, to enable the wiper device to execute a wiping action corresponding to the wiper movement speed control signal, and if the wiper movement adjustment signal output from the manual operation module is received, a current wiper movement speed is adjusted according to the wiper movement speed adjustment signal, and a wiper motor speed adjustment instruction corresponding to the adjusted wiper movement speed is output to the wiper device, to adjust the wiper movement speed; when the wiper is switched from the automatic wiper operation state to the manual wiper operation state, the current wiper movement speed of the wiper is locked as the wiper movement speed in the manual operation state; when the wiper operates in the manual wiper operation state, if the wiper movement speed adjustment signal output from the manual operation module is received, the current wiper movement speed is adjusted according to the wiper movement speed adjustment signal, and the wiper motor speed adjustment instruction corresponding to the adjusted wiper movement speed is output to the wiper device, to adjust the wiper movement speed.

In an embodiment, the microprocessor is further configured to, when the wiper operates in the automatic wiper operation state, after the current wiper movement speed is adjusted according to the wiper movement speed adjustment signal, use a correspondence between the adjusted wiper movement speed and the intensity of precipitation at a moment of receiving the wiper movement speed adjustment signal as a reference to subsequently adjust a plurality of wiper movement speeds corresponding to different intensities of precipitation.

In an embodiment, the wiper movement speed adjustment signal is used for instructing the wiper movement speed to be adjusted up or down.

The microprocessor is configured to adjust the current wiper movement speed according to the wiper movement speed adjustment signal, and output the wiper motor speed adjustment instruction corresponding to the adjusted wiper movement speed to the wiper device through following manners: if the wiper movement speed adjustment signal instructs the wiper movement speed to be adjusted up, a wiper motor rotation speed corresponding to the current wiper movement speed is increased by a speed variation corresponding to a default speed adjustment resolution, and a wiper motor speed adjustment instruction corresponding to the increased wiper motor rotation speed is output to the wiper device; if the wiper movement speed adjustment signal instructs the wiper movement speed to be adjusted down, the wiper motor rotation speed corresponding to the current wiper movement speed is decreased by the speed variation corresponding to the default speed adjustment resolution, and a wiper motor speed adjustment instruction corresponding to the decreased wiper motor rotation speed is output to the wiper device. The default speed adjustment resolution is a default speed variation of the wiper motor rotation speed.

Alternatively, the manual operation module is further configured to output a speed adjustment resolution setting signal to the microprocessor, and the microprocessor is further configured to receive the speed adjustment resolution setting signal output from the manual operation module, and set a speed adjustment resolution according to the speed adjustment resolution setting signal. The speed adjustment resolution is a speed variation of the wiper motor rotation speed. The microprocessor is configured to adjust the current wiper movement speed according to the wiper movement speed adjustment signal, and output the wiper motor speed adjustment instruction corresponding to the adjusted wiper movement speed to the wiper device through following manners: if the wiper movement speed adjustment signal instructs the wiper movement speed to be adjusted up, the wiper motor rotation speed corresponding to the current wiper movement speed is increased by a speed variation corresponding to the set speed adjustment resolution, and a wiper motor speed adjustment instruction corresponding to the increased wiper motor rotation speed is output to the wiper device; if the wiper movement speed adjustment signal instructs the wiper movement speed to be adjusted down, the wiper motor rotation speed corresponding to the current wiper movement speed is decreased by the speed variation corresponding to the set speed adjustment resolution, and a wiper motor speed adjustment instruction corresponding to the decreased wiper motor rotation speed is output to the wiper device.

In an embodiment, the microprocessor is further configured to receive driving information data including a travel speed of a vehicle, a road surface roughness and ambient light outside the vehicle, and set the wiper movement speed of the wiper according to the driving information data and the intensity of precipitation sensed by the rainfall sensor in real time.

The present disclosure further provides a computer-readable storage medium. The computer-readable storage medium stores computer-executable instructions. The computer-executable instructions are used for executing the wiper intelligence control method described above.

According to the present disclosure, the wiper intelligence control method and device implement at the same time a manual wiper adjustment function and a rainfall sense automatic wiper adjustment function in a single control device, and the manual wiper adjustment function and the automatic wiper adjustment function can operate interactively. That is, when the wiper operates in the automatic wiper operation state, a driver can manually adjust a wiper movement speed preset according to the intensity of precipitation until the wiper movement speed required by the driver is reached, so that the wiper movement speed can meet the current requirement of the driver and the individual difference requirements of the drivers more. Thus, the adjustment of the wiper movement speed of the wiper is more humanized. In addition, according to the technical schemes provided by the present disclosure, the current wiper movement speed in the automatic wiper operation state can be locked as the wiper movement speed of the wiper in the manual wiper operation state at any time. When the wiper operates in the manual wiper operation state, under the condition that the wiper movement speed of the wiper is not the wiper movement speed required by the driver, the driver can adjust the current wiper movement speed until the wiper movement speed required by the driver is reached. Therefore, the multi-level adjustment of the wiper movement speed of the wiper is implemented, the operations are simple, and the adjustment efficiency of the wiper movement speed of the wiper is improved.

DETAILED DESCRIPTION

The present disclosure will be described below with reference to the relevant drawings. The drawings show the embodiments of the present disclosure. When an element is described as being "connected to" another element, the element may be directly connected to another element or intervening elements may be present. Unless otherwise defined, all technical and scientific terms used herein have the same meaning as the terms commonly understood by those skilled in the art. Terms used in the description of the present disclosure are only used for describing the embodiments and not intended to limit the present disclosure. As used in the present disclosure, the term "and/or" includes any and all combinations of at least one of the relevant listed items.

The manual wiper and automatic wiper on a vehicle usually selectively operate by manually switching an electrical switch. During the actual use, the manual wiper and the automatic wiper have following defects: first, since the manual wiper is usually provided with six operation gears, when the driver conducts a wiper movement speed adjustment operation, the driver needs to accurately and manually adjust to a required correct gear and according to a gear order, and does not skip a gear, where the operations are complex, and the execution efficiency is low; second, due to the wiper movement speed of the automatic wiper being determined by an intensity of precipitation sensed by a rainfall sensor, and the individual differences of different drivers, the requirements on the wiper movement speed are different under the condition of the same intensity of precipitation, and even for the same driver, under the condition of different time, different physical conditions and the same intensity of precipitation, the requirements on the wiper movement speed may be different. However, the wiper movement speed of the automatic wiper is merely controlled by the intensity of precipitation, and the driver of the vehicle cannot actively adjust.

Figure 1:
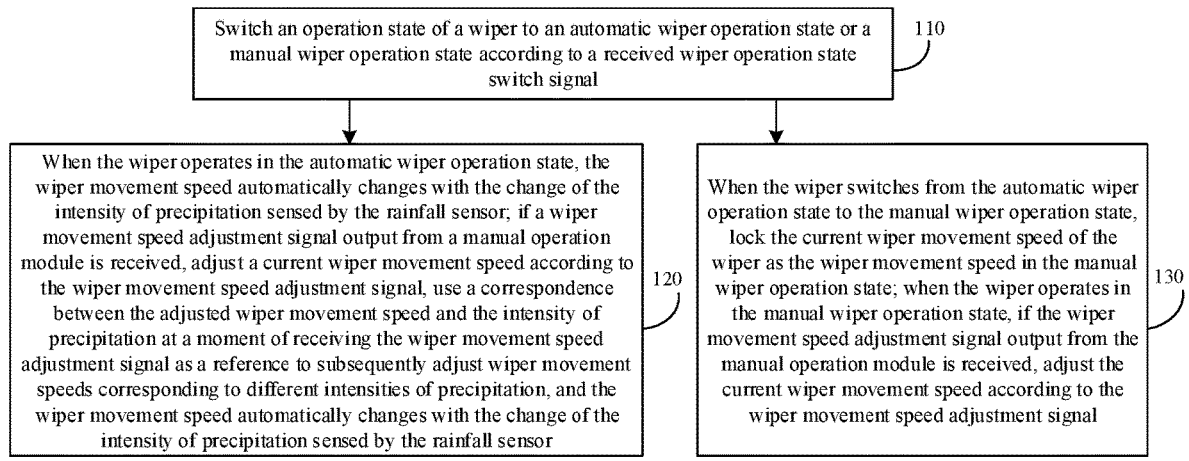
FIG. 1 is a flowchart of a wiper intelligence control method according to an embodiment.

FIG. 1 is a flowchart of a wiper intelligence control method according to an embodiment. As shown in FIG. 1, the wiper intelligence control method according to this embodiment includes steps described below.

In step 110, an operation state of a wiper is switched to an automatic wiper operation state or a manual wiper operation state according to a received wiper operation state switch signal.

The automatic wiper operation state refers to that a wiper movement speed of the wiper automatically changes with change of an intensity of precipitation sensed by a rainfall sensor. The manual wiper operation state refers to that the wiper movement speed of the wiper stays unchanged once adjusted, and does not change with the change of the intensity of precipitation.

In step 120, when the wiper operates in the automatic wiper operation state, the wiper movement speed automatically changes with the change of the intensity of precipitation sensed by the rainfall sensor; if a wiper movement speed adjustment signal output from a manual operation module is received, a current wiper movement speed is adjusted according to the wiper movement speed adjustment signal, a correspondence between the adjusted wiper movement speed and the intensity of precipitation at a moment of receiving the wiper movement speed adjustment signal is used as a reference to subsequently adjust wiper movement speeds corresponding to different intensities of precipitation, and the wiper movement speed automatically changes with the change of the intensity of precipitation sensed by the rainfall sensor.

In this embodiment, the manual operation module is a module provided for a user to adjust the wiper movement speed.

In step 130, when the wiper switches from the automatic wiper operation state to the manual wiper operation state, the current wiper movement speed of the wiper is locked as the wiper movement speed in the manual wiper operation state; when the wiper operates in the manual wiper operation state, if the wiper movement speed adjustment signal output from the manual operation module is received, the current wiper movement speed is adjusted according to the wiper movement speed adjustment signal.

According to the wiper control method in the embodiment, both a manual wiper adjustment function and a rainfall sense automatic wiper adjustment function are included, and these two functions, the manual wiper adjustment function and the automatic wiper adjustment function, can operate interactively. That is, when the wiper operates in the automatic wiper operation state, the driver can manually adjust the wiper movement speed preset according to the intensity of precipitation until the wiper movement speed required by the driver is reached, so that the wiper movement speed can meet the current requirement of the driver and the individual difference requirements of the drivers more. Thus, the adjustment of the wiper movement speed of the wiper is more humanized. In addition, the current wiper movement speed in the automatic wiper operation state can be locked as the wiper movement speed of the wiper in the manual wiper operation state at any time. When the wiper operates in the manual wiper operation state, and the wiper movement speed of the wiper is not the wiper movement speed required by the driver, the driver can adjust the current wiper movement speed until the wiper movement speed required by the driver is reached. Therefore, the multi-level adjustment of the wiper movement speed is implemented, the operations are simple, and the adjustment efficiency of the wiper movement speed of the wiper is improved.

In an embodiment, the wiper movement speed adjustment signal is used for instructing the wiper movement speed to be adjusted up or down. The step in which the current wiper movement speed is adjusted according to the wiper movement speed adjustment signal includes following steps: if the wiper movement speed adjustment signal instructs the wiper movement speed to be adjusted up, a wiper motor rotation speed corresponding to the current wiper movement speed is increased by a speed variation corresponding to a default speed adjustment resolution; if the wiper movement speed adjustment signal instructs the wiper movement speed to be adjusted down, the wiper motor rotation speed corresponding to the current wiper movement speed is decreased by the speed variation corresponding to the default speed adjustment resolution. The default speed adjustment resolution is a default speed variation of the wiper motor rotation speed.

In an embodiment, the wiper movement speed adjustment signal is used for instructing the wiper movement speed to be adjusted up or down. Before the step in which the current wiper movement speed is adjusted according to the wiper movement speed adjustment signal, the method further includes following steps: a speed adjustment resolution setting signal output form the manual operation module is received, and a speed adjustment resolution is set according to the speed adjustment resolution setting signal, where the speed adjustment resolution is a speed variation of a wiper motor rotation speed. The step in which the current wiper movement speed is adjusted according to the wiper movement speed adjustment signal includes following steps: if the wiper movement speed adjustment signal instructs the wiper movement speed to be adjusted up, the wiper motor rotation speed corresponding to the current wiper movement speed is increased by a speed variation corresponding to the set speed adjustment resolution; if the wiper movement speed adjustment signal instructs the wiper movement speed to be adjusted down, the wiper motor rotation speed corresponding to the current wiper movement speed is decreased by the speed variation corresponding to the set speed adjustment resolution.

In another embodiment, a wiper intelligence control method is provided. The method includes following steps: an operation state of a wiper is switched to an automatic wiper operation state or a manual wiper operation state according to a received wiper operation state switch signal. The automatic wiper operation state refers to that a wiper movement speed of the wiper automatically changes with change of an intensity of precipitation sensed by a rainfall sensor. The manual wiper operation state refers to that the wiper movement speed of the wiper stays unchanged once adjusted, and the wiper movement speed does not change with the change of the intensity of precipitation.

When the wiper operates in the automatic wiper operation state, if the wiper movement speed preset according to the intensity of precipitation is not the wiper movement speed required by the driver, the current wiper movement speed is adjusted until the wiper movement speed required by the driver is reached. The adjustment refers to that the purpose of adjusting the wiper movement speed is implemented by adjusting the wiper motor rotation speed.

When the wiper operates in the manual wiper operation state, the driver manually adjusts the current wiper movement speed until the wiper movement speed required by the driver is reached. The adjustment refers to that the purpose of adjusting the wiper movement speed is implemented by adjusting the wiper motor rotation speed.

When the wiper is switched from the automatic wiper operation state to the manual wiper operation state, the current wiper movement speed of the wiper is locked as the wiper movement speed in the manual wiper operation state. If the wiper movement speed in the manual wiper operation state is not the wiper movement speed required by the driver, the current wiper movement speed is adjusted until the wiper movement speed required by the driver is reached. The adjustment refers to that the purpose of adjusting the wiper movement speed is implemented by adjusting the wiper motor rotation speed.

When the wiper is switched from the manual wiper operation state to the automatic wiper operation state, the wiper moves according to the preset wiper movement speed and with the intensity of precipitation. If the wiper movement speed preset according to the intensity of precipitation is not the wiper movement speed required by the driver, the current wiper movement speed is adjusted until the wiper movement speed required by the driver is reached. The adjustment refers to that the purpose of adjusting the wiper movement speed is implemented by adjusting the wiper motor rotation speed.

In an embodiment, the step in which if the wiper movement speed preset according to the intensity of precipitation is not the wiper movement speed required by the driver, the current wiper movement speed is adjusted until the wiper movement speed required by the driver is reached includes following steps: if the wiper movement speed preset according to the intensity of precipitation is not the wiper movement speed required by the driver, the current wiper movement speed is adjusted until the wiper movement speed required by the driver is reached, and a correspondence between the wiper movement speed and the intensity of precipitation at a mount that the wiper movement speed required by the driver is reached is used as a new reference to subsequently adjust wiper movement speeds corresponding to different intensities of precipitation. In this way, since the operation state of the wiper is still in the automatic wiper operation state, for the change of new intensities of precipitation subsequently sensed by the rainfall sensor, the wiper movement speed automatically makes corresponding new changes with the change of the intensity of precipitation according to the new reference. The wiper speed does not need to be manually adjusted when the intensity of precipitation changes each time, and the intelligence degree is high.

In an embodiment, the step in which if the wiper movement speed preset according to the intensity of precipitation is not the wiper movement speed required by the driver, the current wiper movement speed is adjusted until the wiper movement speed required by the driver is reached includes following steps: if the wiper movement speed preset according to the intensity of precipitation is not the wiper movement speed required by the driver, the current wiper movement speed is adjusted according to a speed adjustment gear level selected by the driver and the default speed adjustment resolution and in accordance with the speed adjustment gear level selected by the driver and the default speed adjustment resolution until the wiper movement speed required by the driver is reached; or, if the wiper movement speed preset according to the intensity of precipitation is not the wiper movement speed required by the driver, the current wiper movement speed is adjusted according to the speed adjustment resolution and the speed adjustment gear level selected by the driver and in accordance with the speed adjustment resolution and the speed adjustment gear level selected by the driver until the wiper movement speed required by the driver is reached. The speed adjustment resolution refers to the number of turns of the wiper motor rotation speed changed per minute (namely the rotation speed variation of the wiper motor rotation speed) during each speed adjustment operation.

In an embodiment, if the wiper movement speed preset according to the intensity of precipitation is not the wiper movement speed required by the driver, the driver may first choose to adjust the current wiper movement speed in accordance with the default speed adjustment resolution; when the driver feels that the adjustment amplitude of the default speed adjustment resolution does not meet the requirement, the driver selects other speed adjustment resolutions, and then under the condition that the driver selects the speed adjustment gear level, the current wiper movement speed is adjusted in accordance with the speed adjustment gear level and the speed adjustment resolution selected by the driver until the wiper movement speed required by the driver is reached.

In an embodiment, the step in which if the wiper movement speed in the manual wiper operation state is not the wiper movement speed required by the driver, the current wiper movement speed is adjusted until the wiper movement speed required by the driver is reached includes following steps: if the wiper movement speed in the manual wiper operation state is not the wiper movement speed required by the driver, the current wiper movement speed is adjusted according to the speed adjustment gear level selected by the driver and the default speed adjustment resolution and in accordance with the speed adjustment gear level selected by the driver and the default speed adjustment resolution until the wiper movement speed required by the driver is reached; or, if the wiper movement speed in the manual operation state is not the wiper movement speed required by the driver, the current wiper movement speed is adjusted according to the speed adjustment resolution and the speed adjustment gear level selected by the driver and in accordance with the speed adjustment resolution and the speed adjustment gear level selected by the driver until the wiper movement speed required by the driver is reached. The speed adjustment resolution refers to the number of turns of the wiper motor rotation speed changed per minute during each speed adjustment operation.

In an embodiment, if the wiper movement speed in the manual wiper operation state is not the wiper movement speed required by the driver, the driver may first choose to adjust the current wiper movement speed in accordance with the default speed adjustment resolution. When the driver feels that the adjustment amplitude of the default speed adjustment resolution does not meet the requirement, the driver manually selects other speed adjustment resolutions, and then under the condition that the driver selects the speed adjustment gear level, the current wiper movement speed is adjusted in accordance with the speed adjustment gear level and the speed adjustment resolution selected by the driver until the wiper movement speed required by the driver is reached.

Figure 2:
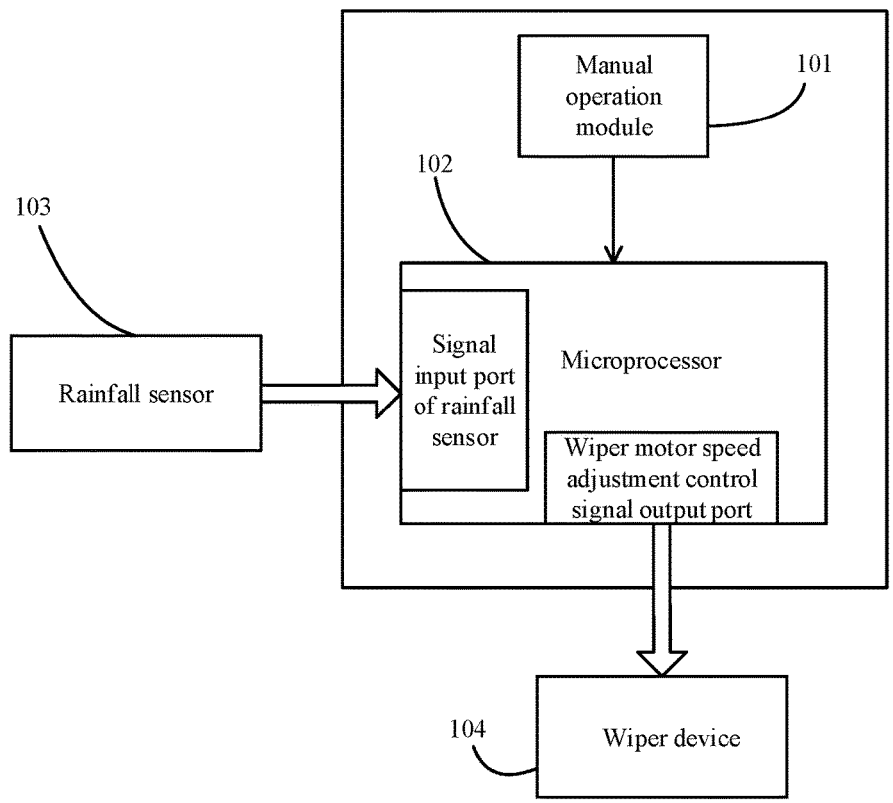
FIG. 2 is a structural diagram of a wiper intelligence control device according to an embodiment.

As shown in FIG. 2, FIG. 2 is a structural diagram of a wiper intelligence control device according to an embodiment.

This embodiment further discloses a wiper intelligence control device based on the above wiper intelligence control method. The wiper intelligence control device includes a manual operation module 101 and a microprocessor 102. In this embodiment, the microprocessor 102 is a Microcontroller Unit (MCU). The microprocessor 102 may be a built-in microprocessor of the intelligence control device, or may be a microprocessor in an on-board control module or a control unit of the vehicle. For example, the microprocessor 102 may be a processor in a BCM.

In this embodiment, the manual operation module 101 is configured to output a wiper operation state switch signal to the microprocessor 102. The manual operation module 101 is further configured to output a wiper movement speed adjustment signal to the microprocessor 102. The microprocessor 102 is configured to be connected to a rainfall sensor 103 and a wiper device 104. The microprocessor 102 is further configured to perform following operations: an operation state of a wiper is switched to an automatic wiper operation state or a manual wiper operation state according to the wiper operation state switch signal output from the manual operation module 101; when the wiper operates in the automatic wiper operation state, a wiper movement speed corresponding to an intensity of precipitation sensed by the rainfall sensor in real time is calculated according to a preset correspondence between the intensity of precipitation and the wiper movement speed, a wiper movement speed control signal corresponding to the wiper movement speed is output to the wiper device 104, to enable the wiper device 104 to execute a wiping action corresponding to the wiper movement speed control signal, and if the wiper movement adjustment signal output from the manual operation module 101 is received, a current wiper movement speed is adjusted according to the wiper movement speed adjustment signal, and a wiper motor speed adjustment instruction corresponding to the adjusted wiper movement speed is output to the wiper device 104, to adjust the wiper movement speed; when the wiper is switched from the automatic wiper operation state to the manual wiper operation state, the current wiper movement speed of the wiper is locked as the wiper movement speed in the manual operation state; when the wiper operates in the manual wiper operation state, if the wiper movement speed adjustment signal output from the manual operation module 101 is received, the current wiper movement speed is adjusted according to the wiper movement speed adjustment signal, and the wiper motor speed adjustment instruction corresponding to the adjusted wiper movement speed is output to the wiper device 104, to adjust the wiper movement speed.

In an embodiment, the microprocessor 102 is further configured to, when the wiper operates in the automatic wiper operation state, after the current wiper movement speed is adjusted according to the wiper movement speed adjustment signal, use a correspondence between the adjusted wiper movement speed and the intensity of precipitation at a moment of receiving the wiper movement speed adjustment signal as a reference to subsequently adjust wiper movement speeds corresponding to different intensities of precipitation.

In an embodiment, the wiper movement speed adjustment signal is used for instructing the wiper movement speed to be adjusted up or down. The microprocessor 102 is configured to adjust the current wiper movement speed according to the wiper movement speed adjustment signal, and output a wiper motor speed adjustment instruction corresponding to the adjusted wiper movement speed to the wiper device 104 through following manners: if the wiper movement speed adjustment signal instructs the wiper movement speed to be adjusted up, a wiper motor rotation speed corresponding to the current wiper movement speed is increased by a speed variation corresponding to a default speed adjustment resolution, and a wiper motor speed adjustment instruction corresponding to the increased wiper motor rotation speed is output to the wiper device 104; if the wiper movement speed adjustment signal instructs the wiper movement speed to be adjusted down, the wiper motor rotation speed corresponding to the current wiper movement speed is decreased by the speed variation corresponding to the default speed adjustment resolution, and a wiper motor speed adjustment instruction corresponding to the decreased wiper motor rotation speed is output to the wiper device 104. The default speed adjustment resolution is a default speed variation of the wiper motor rotation speed.

In an embodiment, the manual operation module 101 is further configured to output a speed adjustment resolution setting signal to the microprocessor 102. The microprocessor 102 is further configured to receive the speed adjustment resolution setting signal output from the manual operation module, and set a speed adjustment resolution according to the speed adjustment resolution setting signal. The speed adjustment resolution is a speed variation of a wiper motor rotation speed. The microprocessor 102 is configured to adjust the current wiper movement speed according to the wiper movement speed adjustment signal, and output a wiper motor speed adjustment instruction corresponding to the adjusted wiper movement speed to the wiper device 104 through following manners: if the wiper movement speed adjustment signal instructs the wiper movement speed to be adjusted up, the wiper motor rotation speed corresponding to the current wiper movement speed is increased by a speed variation corresponding to the set speed adjustment resolution, and a wiper motor speed adjustment instruction corresponding to the increased wiper motor rotation speed is output to the wiper device 104; if the wiper movement speed adjustment signal instructs the wiper movement speed to be adjusted down, the wiper motor rotation speed corresponding to the current wiper movement speed is decreased by the speed variation corresponding to the set speed adjustment resolution, and a wiper motor speed adjustment instruction corresponding to the decreased wiper motor rotation speed is output to the wiper device 104.

In an embodiment, the microprocessor 102 is further configured to receive driving information data including a travel speed of the vehicle, a road surface roughness and ambient light outside the vehicle, and set the wiper movement speed of the wiper according to the driving information data and the intensity of precipitation sensed by the rainfall sensor in real time.

In another embodiment, a wiper intelligence control device is provided. Referring to FIG. 2, the wiper intelligence control device includes the manual operation module 101 and the microprocessor 102. The manual operation module 101 is connected to the microprocessor 102. The manual operation module 101 is configured to perform following operations: first, the wiper operation state switch signal is output to the microprocessor 102; second, the wiper movement speed adjustment signal is output to the microprocessor 102. The microprocessor 102 is configured to be connected to the rainfall sensor 103 and the wiper device 104. The microprocessor 102 is further configured to perform following operations: first, the operation state of the wiper is switched to the automatic wiper operation state or the manual wiper operation state according to the wiper operation state switch signal output from the manual operation module 101; second, when the wiper operates in the automatic wiper operation state, the wiper movement speed corresponding to the intensity of precipitation sensed by the rainfall sensor 103 in real time is calculated according to the preset correspondence between the intensity of precipitation and the wiper movement speed, the wiper movement speed control signal corresponding to the wiper movement speed is output to the wiper device 104, to enable the wiper device 104 to execute the wiping action corresponding to the wiper movement speed control signal, and if the wiper movement speed at this moment is not the wiper movement speed required by the driver, the wiper movement speed adjustment signal output from the manual operation module 101 is processed, and the wiper motor speed adjustment instruction is output to the wiper device 104, to adjust the wiper movement speed until the wiper movement speed required by the driver is reached, where the speed adjustment instruction implements the purpose of adjusting the wiper movement speed by adjusting the wiper motor rotation speed; third, when the wiper is switched from the automatic wiper operation state to the manual wiper operation state, the current wiper movement speed of the wiper is locked as the wiper movement speed in the manual operation state, and if the wiper movement speed in the manual wiper operation state is not the wiper movement speed required by the driver, the wiper movement speed adjustment signal output from the manual operation module 101 is processed, and the wiper motor speed adjustment instruction is output to the wiper device 104, to adjust the wiper movement speed until the wiper movement speed required by the driver is reached, where the speed adjustment instruction implements the purpose of adjusting the wiper movement speed by adjusting the wiper motor rotation speed, the automatic wiper operation state refers to that the wiper movement speed of the wiper automatically changes with the change of the intensity of precipitation sensed by the rainfall sensor 103, and the manual wiper operation state refers to that the wiper movement speed of the wiper stays unchanged once adjusted and the wiper movement speed does not change with the change of the intensity of precipitation; fourth, when the wiper operates in the manual wiper operation state, if the driver adjusts the current wiper movement speed, the microprocessor 102 processes the wiper movement speed adjustment signal output from the manual operation module 101, and outputs the wiper motor speed adjustment instruction to the wiper device 104, to adjust the wiper movement speed until the wiper movement speed required by the driver is reached, where the speed adjustment instruction implements the purpose of adjusting the wiper movement speed by adjusting the wiper motor rotation speed; fifth, when the wiper is switched from the manual wiper operation state to the automatic wiper operation state, the wiper moves according to the preset wiper movement speed and with the intensity of precipitation, and if the wiper movement speed preset according to the intensity of precipitation is not the wiper movement speed required by the driver, the microprocessor 102 processes the wiper movement speed adjustment signal output from the manual operation module and outputs the wiper motor speed adjustment instruction to the wiper device 104, to adjust the wiper movement speed until the wiper movement speed required by the driver is reached, where the speed adjustment instruction implements the purpose of adjusting the wiper movement speed by adjusting the wiper motor rotation speed.

In an embodiment, the microprocessor 102 is further configured to perform following operations: according to the wiper movement speed adjustment signal output from the manual operation module 101, after the wiper movement speed is adjusted to the wiper movement speed required by the driver through at least one adjustment, the correspondence between the wiper movement speed and the intensity of precipitation at this moment is used as a reference, and the wiper movement speeds corresponding to different intensities of precipitation are automatically subsequently adjusted through the rainfall sensor.

In an embodiment, the manual operation module 101 is configured to output the wiper movement speed adjustment signal to the microprocessor 102 through a following manner: the wiper movement speed adjustment signal corresponding to the speed adjustment gear level selected by the driver is output to the microprocessor 102 according to the speed adjustment gear level selected by the driver. The microprocessor 102 is configured to process the wiper movement speed adjustment signal output from the manual operation module 101 and output the wiper motor speed adjustment instruction to the wiper device 104 through a follow manner: after the wiper movement speed adjustment signal output from the manual operation module 101 is processed, a corresponding wiper motor speed adjustment instruction is output to the wiper device 104 in accordance with the speed adjustment gear level selected by the driver and the default speed adjustment resolution, to adjust the wiper movement speed.

In an embodiment, the manual operation module 101 is further configured to output a corresponding speed adjustment resolution setting signal to the processor 102 according to the speed adjustment resolution selected by the driver. The manual operation module 101 is configured to output the wiper movement speed adjustment signal to the microprocessor 102 through a following manner: the wiper movement speed adjustment signal corresponding to the speed adjustment gear level selected by the driver is output to the microprocessor 102 according to the speed adjustment gear level selected by the driver. The microprocessor 102 is configured to process the wiper movement speed adjustment signal output from the manual operation module 101 and output the wiper motor speed adjustment instruction to the wiper device 104 through a following manner: after the wiper movement speed adjustment signal output from the manual operation module 101 is processed, a corresponding wiper motor speed adjustment instruction is output to the wiper device 104 in accordance with the speed adjustment gear level and the speed adjustment resolution selected by the driver corresponding to the speed adjustment resolution setting signal, to adjust the wiper movement speed. The speed adjustment resolution refers to the number of turns of the wiper motor rotation speed changed per minute during each speed adjustment operation. In an embodiment, if the wiper movement speed is not the wiper movement speed required by the driver, the driver may first choose to adjust the current wiper movement speed in accordance with the default speed adjustment resolution. When the driver feels that the adjustment amplitude of the default speed adjustment resolution does not meet the requirement, the driver selects other speed adjustment resolutions through the manual operation module 101, and then under the condition that the driver selects the speed adjustment gear level, the microprocessor 102 adjusts the current wiper movement speed in accordance with the speed adjustment gear level and the speed adjustment resolution selected by the driver until the wiper movement speed required by the driver is reached.

In an embodiment, the microprocessor 102 is further configured to receive driving information data including, but not limited to, a travel speed of the vehicle, a road surface roughness and ambient light outside the vehicle, and set the wiper movement speed of the wiper according to the driving information data and the intensity of precipitation sensed by the rainfall sensor 103 in real time.

Implementations and operating processes of the wiper intelligence control device provided by the above embodiments are briefly described with reference to specific examples.

In this embodiment, the wiper device 104 mainly includes a wiper motor, a wiper motor speed adjustment/drive unit, a speed reduction mechanism, a mechanical actuator and a wiper arm/blade mechanism. The wiper movement speed of the wiper described above actually refers to a reciprocating movement speed of the wiper arm/blade. In this embodiment, the rain sensor 103 is connected to a signal input port of the rain sensor 103 of the microprocessor 102. In an embodiment, the rain sensor 103 and the microprocessor 102 may be directly connected, that is, the output signal from the rain sensor 103 is directly connected to a corresponding input port of the microprocessor 102. Similarly, the rain sensor 103 and the microprocessor 102 may be connected via a bus of the vehicle. For example, the rain sensor 103 and the microprocessor 102 is connected via a Controller Area Network (CAN) bus or a Local Interconnect Network (LIN) bus, so that the rain sensor 103 transmits the sensed information of the intensity of precipitation to the microprocessor 102 via the bus. The wiper motor speed adjustment/drive unit is connected to a wiper motor speed adjustment control signal output port of the microprocessor 102. In an embodiment, the wiper motor may adopt, but is not limited to, a direct current (DC) motor or a stepper motor. Different types of wiper motors have different driving manners. For different types of wiper motors, the wiper intelligence control device may be different in details of speed adjustment and control scheme, which may be adjusted to implement the same function. The rotation state of the DC motor is controlled by a Pulse Width Modulation (PWM) Pulse, that is, a pulse electrical signal with a certain frequency and adjustable pulse width is provided for the DC motor. When the pulse width is larger (i.e., the duty cycle is larger), a larger average voltage is provided for the DC motor, and the rotation speed of the DC motor is higher. On the contrary, when the pulse width is smaller (i.e., the duty cycle is smaller), a smaller average voltage is provided for the DC motor, and the rotation speed of the DC motor is lower. The signal controlling the stepper motor is a single pulse, and each single pulse enables the stepper motor to rotate for an angle. Both the PWM pulse and the single pulse may be directly generated and output by the microprocessor 102, thus a wiper motor speed adjustment control signal output module does not need to be additionally designed in this embodiment. In an embodiment, the signal of the intensity of precipitation output from the rainfall sensor 103, whether it is a digital quantity or an analog quantity, may be read via a corresponding digital quantity input port or Analog-to-Digital (A/D) conversion input port of the microprocessor 102 with the A/D conversion port. Therefore, a corresponding signal Input/Output (I/O) module of the rainfall sensor 103 does not need to be additionally designed. But not limited to this, for different implementations of the wiper intelligence control device, a corresponding I/O module may be additionally designed as an interface among the microprocessor 102, an external sensor and the wiper device 104. Similarly, in an embodiment, the signal transmission between the microprocessor 102 and the rain sensor 103, or other external sensors and the wiper device 104, may be implemented via the bus of the vehicle, and signals output from the rain sensor 103 or other external sensors are read by the microprocessor 102 via the bus of the vehicle, for example, the LIN bus. The microprocessor 102 outputs control signals for the wiper, either directly to the wiper device 104 or to the wiper device 104 via the bus of the vehicle.

Figure 3:
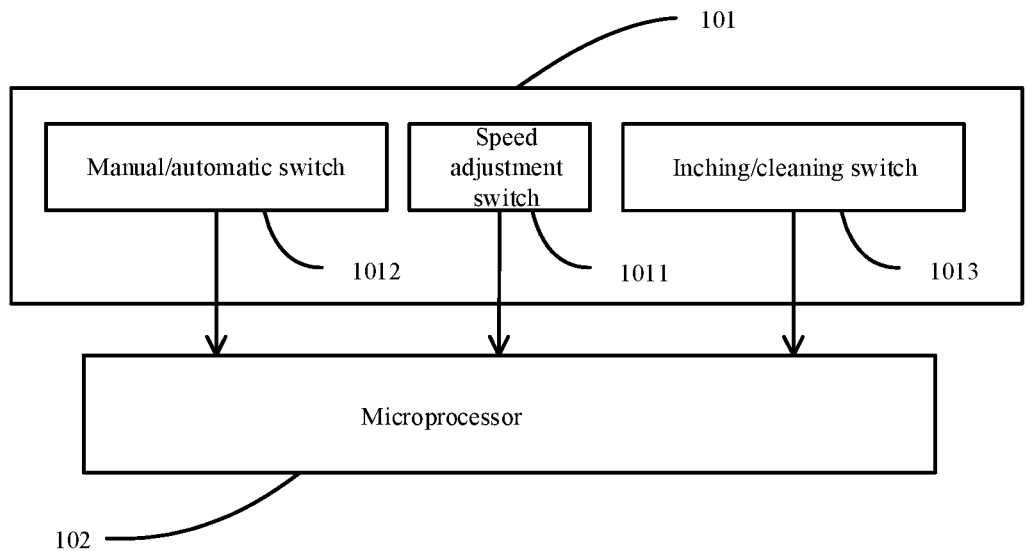
FIG. 3 is a structural diagram of a manual operation module according to an embodiment.

As shown in FIG. 3, the manual operation module 101 includes a speed adjustment switch 1011 and a manual/automatic switch 1012. In this embodiment, when the wiper operates in the automatic wiper operation state, the rainfall sensor 103 senses the intensity of precipitation outside the vehicle and sends an electrical signal (which may be an analog signal or a digital signal converted through the A/D conversion) corresponding to the sensed intensity of precipitation to the microprocessor 102. The correspondence between the intensity of precipitation and the wiper movement speed has been preset inside the microprocessor 102 (that is, different wiper motor rotation speeds correspond to different intensities of precipitation). The microprocessor 102 may determine the corresponding wiper motor rotation speed according to the intensity of precipitation outside the vehicle sensed by the rainfall sensor 103 during driving, and generates a corresponding wiper speed control signal to the wiper device 104, so that the wiper device 104 executes a corresponding wiping action. In an embodiment, the process of the wiper device 104 executing the corresponding wiping action is as follows: the wiper movement speed control signal implements the speed adjustment of the wiper motor through the wiper motor speed adjustment/drive unit, and the rotation of the wiper motor is reduced by the reduction mechanism to drive the mechanical actuator (such as a linkage) to reciprocate; finally, the mechanical actuator drives the wiper arm/blade mechanism to reciprocate at a corresponding speed, so as to wipe off rainwater from a windscreen of the vehicle. During driving in the rain, the driver turns on a power switch of the wiper intelligence control device. In the automatic wiper operation state, the microprocessor 102 controls the wiper motor to adjust the corresponding wiper motor rotation speed in real time with the change of the intensity of precipitation according to the intensity of precipitation sensed by the rain sensor 103. In this way, as the intensity of precipitation outside the vehicle changes, the wiper movement speed of the wiper changes accordingly, and the driver does not need to conduct manually adjustments. However, for the driver of the vehicle, under the condition of the same intensity of precipitation, the requirements of different drivers on the wiper movement speed of the wiper may be different due to the existence of individual differences. Even for the same driver, under the condition of different physical conditions or external environments, the requirements on the wiper movement speed may be different. For example, a certain driver feels that the wiper movement speed set by the automatic wiper is too low, and wants to increase the wiper movement speed. In this embodiment, the method includes: the speed adjustment switch 1011 of the manual operation module 101 outputs the wiper movement speed adjustment signal to the microprocessor 102, that is, a manual operation action of "speed-up" adjustment or "speed-down" adjustment defined by the driver is converted into an electrical signal (that is, the wiper movement speed adjustment signal) and the electrical signal is sent to the microprocessor 102; each time the microprocessor 102 receives the speed adjustment signal once and processes the speed adjustment signal, the microprocessor 102 outputs the wiper motor speed adjustment instruction to the wiper device 104 once, and the wiper device 104 executes the wiper speed adjustment once. Therefore, the purpose of adjusting the wiper movement speed of the wiper is achieved. The wiper movement speed can be adjusted to the wiper movement speed required by the driver by repeatedly executing the processes at least once as needed.

Figure 4:
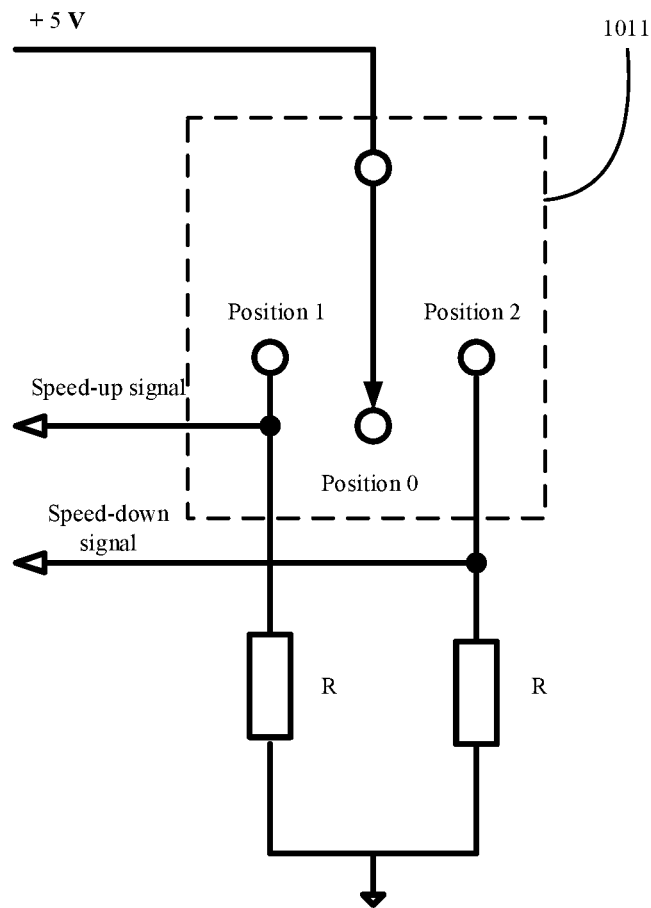
FIG. 4 is a structural diagram of a speed adjustment switch according to an embodiment.

FIG. 4 is a structural diagram of a speed adjustment switch according to an embodiment. As shown in FIG. 4, in this embodiment, the speed adjustment switch 1011 adopts a mechanical "toggle" electrical switch, single-pole dual-throw (SPDT) self-reset electrical switch. When the switch is toggled to one side, the wiper movement speed is increased by one speed gear level (namely the speed adjustment gear level in the above embodiments) (for example, the wiper motor rotation speed is increased by 3 circles/minute). When the switch is toggled to the other side, the wiper movement speed is decreased by one speed gear level (for example, the wiper motor rotation speed is decreased by 3 circles/minute). As shown in FIG. 4, when the speed adjustment switch 1011 is toggled to a position 1, the manual module 101 sends a speed-up signal to the microprocessor 102. When the speed adjustment switch 1011 is toggled to a position 2, the manual module 101 sends a speed-down signal to the microprocessor 102. Both the speed-up signal and the speed-down signal are the wiper movement speed adjusting signal. The speed adjustment switch 1011 in FIG. 4 adopts a self-reset mechanical electrical switch, that is, the driver manually toggles the switch to the position 1 (or the position 2) to generate the speed-up signal (or the speed-down signal). When the driver releases the hand toggling the switch, the switch automatically returns to a position 0, and the speed-up signal (or the speed-down signal) disappears. After the microprocessor 102 receives the wiper movement speed adjustment signal, the microprocessor 102 processes the wiper movement speed adjustment signal and outputs the wiper motor speed adjusting instruction to the wiper device 104 once, and the wiper device 104 executes the wiper speed adjustment once. Finally, the wiper movement speed is increased by one speed gear level (or the wiper movement speed is decreased by one speed gear level).

As shown in FIG. 4, as an example, but not limited thereto, the speed adjustment switch 1011 may be designed as a speed adjustment lever. The speed adjustment lever is slightly pushed upwards for a "speed-up" adjustment and downwards for "speed-down". For example, the manual operation actions are as follows: the speed adjustment lever is slightly pushed upwards (or downwards) by a hand, then the hand withdraws, and the speed adjustment lever automatically returns to an original normal position, where the wiper motor rotation speed is increased by one gear level (for example, the wiper motor rotation speed is increased by 3 circles/minute) when the speed adjustment lever is slightly pushed "upwards" once; the wiper motor rotation speed is decreased by one gear level (for example, the wiper motor rotation speed is decreased 3 circles/minute) when the speed adjustment lever is slightly pushed "downwards" once; the speed adjustment lever is slightly pushed "upwards" by the hand and kept for a certain duration (for example, 3 seconds or more), then the hand withdraws, and the wiper motor rotation speed (skipping all intermediate "gear levels") is directly increased to the highest rotation speed preset in the intelligence wiper control device; the speed adjustment lever is slightly pushed "downwards" by the hand and kept for a certain duration (for example, 3 seconds or more), then the hand withdraws, and the wiper motor rotation speed (skipping all intermediate "gear levels") is directly decreased to the lowest rotation speed preset in the intelligence wiper control device. In this embodiment, the operations of manually adjusting the wiper movement speed of the wiper by the adjustment switch may be used in the automatic wiper operation state or the manual wiper operation state.

As another embodiment, but not limited thereto, the speed adjustment switch 1011 may be designed as the self-reset toggle switch. The principle of the self-reset toggle switch is the single pole dual throw self-reset switch. As shown in FIG. 4, the self-reset toggle switch is toggled to "one side" for "speed-up", and the self-reset toggle switch is toggled to "the other side" for "speed-down". For example, the manual operation actions are as follows: the self-reset toggle switch is toggled to "right" (or "left") by a hand, then the hand withdraws, and the self-reset toggle switch automatically returns to an original normal position, where the wiper motor rotation speed is increased by one gear level (for example, the wiper motor rotation speed is increased by 3 circles/minute) when the self-reset toggle switch is toggled to "right" once; the wiper motor rotation speed is decreased by one gear level (for example, the wiper motor rotation speed is decreased by 3 circles/minute) when the self-reset toggle switch is toggled "left" once; the self-reset toggle switch is toggle to "right" by the hand and kept for a certain duration (for example, 3 seconds or more), then the hand withdraws, and the wiper motor rotation speed (skipping all intermediate "gear levels") is directly increased to the highest rotation speed preset in the intelligence wiper control device; the self-reset toggle switch is toggled to "left" by the hand and kept for a certain duration (for example, 3 seconds or more), then the hand withdraws, and the wiper motor rotation speed (skipping all intermediate "gear levels") is directly decreased to the lowest rotation speed preset in the intelligence wiper control device. In this embodiment, the operations of manually adjusting the wiper movement speed of the wiper by the adjustment switch may be used in the automatic wiper operation state or the manual wiper operation state.

As another embodiment, but not limited thereto, the speed adjustment switch 1011 may also be designed as a rotation encoder switch. When the rotation encoder switch is rotated to "up" for one gear once, the purpose of "speed-up" to one gear is achieved, and when the rotation encoder switch is rotated to "down" for one gear once, the purpose of "speed-down" to one gear is achieved. For example, the manual operation actions are as follows: the rotation encoder switch is rotated to "up" (or "down") by a hand, where the wiper motor rotation speed is increased by one gear level when the rotation encoder switch is rotated to "up" once, for example, the wiper motor rotation speed corresponding to the increased gear level is increased by 3 circles/minute compared with the wiper motor rotation speed corresponding to the gear level before increased; the wiper motor rotation speed is decreased by one gear level when the rotation encoder switch is rotated to "down" once, for example, the wiper motor rotation speed corresponding to the decreased gear level is decreased by 3 circles/minute compared with the wiper motor rotation speed corresponding to the gear level before decreased; the rotation encoder switch is rotated to "up" rapidly and continuously by the hand (for example, the rotation encoder switch is rotated continuously for more than 3 gear levels within 1 second) and the wiper motor rotation speed (skipping all intermediate "gear levels") is directly increased to the highest rotation speed preset in the intelligence wiper control device; the rotation encoder switch is rotated to "down" rapidly and continuously by the hand (for example, the rotation encoder switch is rotated continuously for more than 3 gear levels within 1 second) and the wiper motor rotation speed (skipping all intermediate "gear levels") is directly decreased to the lowest rotation speed preset in the intelligence wiper control device. In this embodiment, the operations of manually adjusting the wiper movement speed of the wiper by the adjustment switch may be used in the automatic wiper operation state or the manual wiper operation state.

When the wiper intelligence control device operates in the automatic wiper operation state, the wiper movement speed of the wiper is automatically adjusted with the change of the intensity of precipitation sensed by the rainfall sensor 103. At any time of the automatic wiper operation state, the driver may switch the wiper to the manual wiper operation state by operating the manual/automatic switch 1012 in the manual operation module 101, and the wiper motor rotation speed at this moment is locked by the microprocessor 102. The manual/automatic switch 1012 outputs the wiper operation state switch signal to the microprocessor 102. The microprocessor 102 switches the operation state of the wiper from the automatic wiper operation state to the manual wiper operation state according to the received wiper operation state switch signal, and locks the current wiper movement speed as the wiper movement speed in the manual wiper operation state. The microprocessor 102 sends the wiper movement speed control signal to the wiper device 104 to enable the wiper motor of the wiper device 104 to rotate according to the locked rotation speed. In this way, the current wiper movement speed in the automatic wiper operation state is locked as the wiper movement speed in the manual wiper movement speed. The wiper intelligence control device returns to the manual wiper operation state, to keep a fixed wiper movement speed to perform reciprocating movement. When the locked wiper movement speed is not the wiper movement speed required by the driver, the current wiper movement speed is adjusted until the wiper movement speed required by the driver is reached, and the adjustment method is similar to the wiper movement speed adjustment method in the automatic wiper operation state, which is not described in detail herein.

Figure 5:
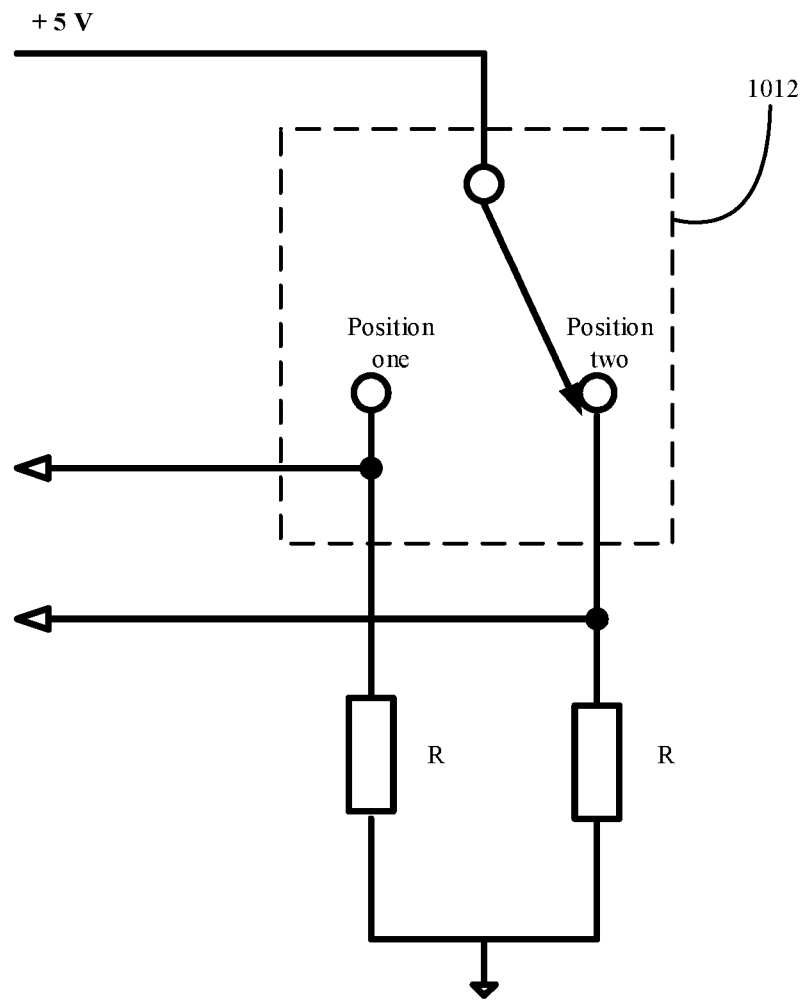
FIG. 5 is a structural diagram of a manual/automatic switch according to an embodiment.
Figure 6:
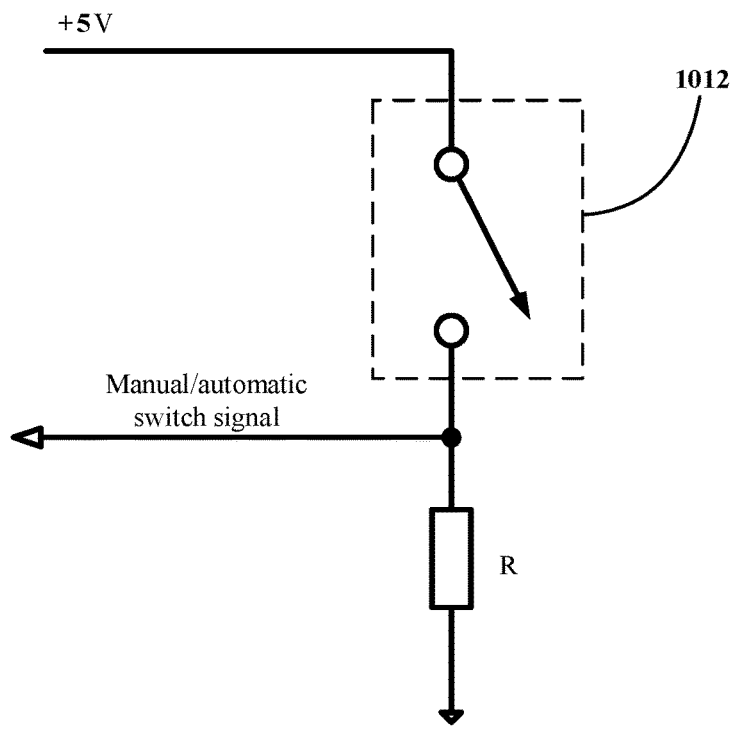
FIG. 6 is a structural diagram of a manual/automatic switch according to another embodiment.

As an embodiment, but not limited thereto, the manual/automatic switch 1012 in the manual operation module 101 is designed as a mechanical electrical switch, which has different principles as shown in FIG. 5 and FIG. 6. A double-gear toggle switch is used in FIG. 5, a position one is the manual wiper operation state, and a position two is the automatic wiper operation state. A self-locking key switch is used in FIG. 6. The self-locking key switch is in the manual wiper operation state when pressed down and in the automatic wiper operation state when bounced up. Any of the above two mechanical electrical switches may be designed as the manual/automatic switch 1012 in the manual operation module 101 for the driver to switch between the manual wiper operation state and the automatic wiper operation state.

As a principle embodiment of FIG. 5, but not limited thereto, the double-gear knob switch may be installed at an end of wiper lever. The double-gear knob switch may be manually rotated from the position two to the position one, to implement the manual wiper operation state, or the double-gear knob switch may be manually rotated from the position one to the position two, to implement the manual wiper operation state. Therefore, the switch of the operation state of the wiper is completed.

Figure 7:
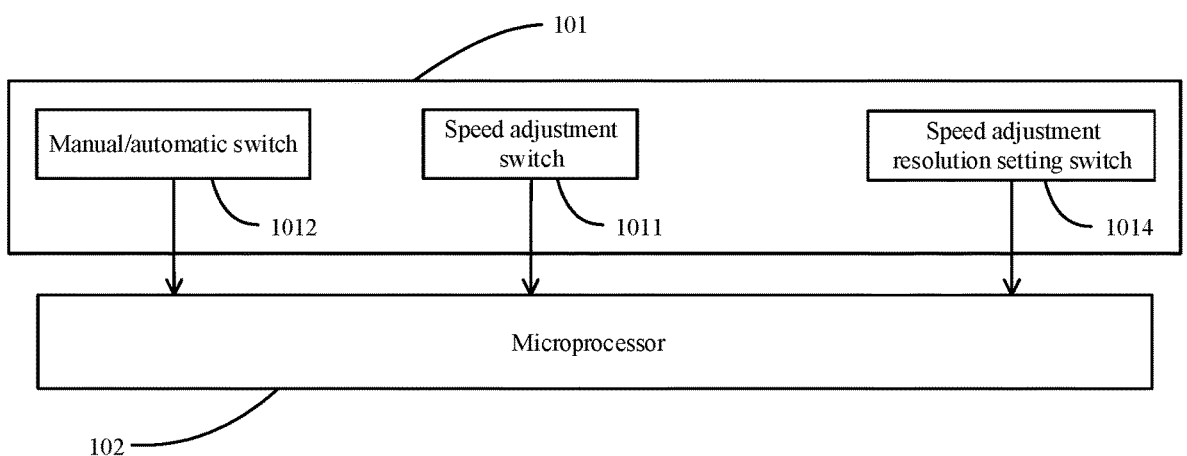
FIG. 7 is a structural diagram of a manual operation module including a speed adjustment resolution setting switch according to an embodiment.
Figure 8:
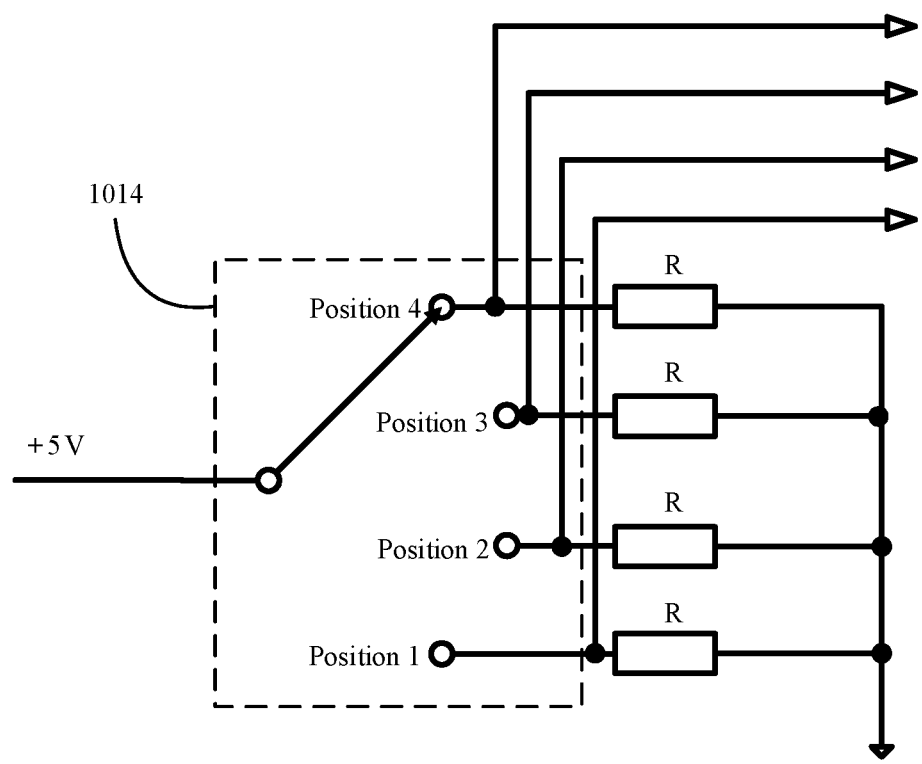
FIG. 8 is a structural diagram of a speed adjustment resolution setting switch according to an embodiment.

As shown in FIG. 7, in this embodiment, a speed adjustment resolution setting switch 1014 is further provided in addition to the manual operation module 101 of FIG. 3. The speed adjustment resolution refers to the number of turns of the wiper motor rotation speed changed per minute during each speed adjustment operation. As an example, but not limited thereto, the speed adjustment resolution setting switch 1014 adopts a multi-level toggle gear mechanical electrical switch, and the multi-level toggle gear mechanical electrical switch has multiple gear levels to be selected. As shown in FIG. 8, the speed adjustment solution setting switch is provided with four gear levels. When the switch is toggled to a position 1, a position 2, a position 3 and a position 4, the switch respectively corresponds to a default solution, a solution 1, a solution 2 and a solution 3. The driver toggles the switch to different positions by the hand to select different gear levels, and sends different speed adjustment solution setting signals to the microprocessor 102. After the microprocessor 102 processes the wiper movement speed adjustment signal output from the speed adjustment switch 1011, the microprocessor 102 outputs a corresponding wiper motor speed adjustment instruction to the wiper device 104 in accordance with the speed adjustment solution and the gear level selected by the driver, to adjust the wiper movement speed. The meaning of the speed adjustment solution in this embodiment is as follows: the speed adjustment switch 1011 in the manual operation module 101 sends the wiper movement speed adjustment signal to the microprocessor 102 once, the microprocessor 102 outputs the wiper motor speed adjustment instruction to the wiper device 104, to enable the wiper motor rotation speed of the wiper device 104 to be increased or decreased by few circles per minute. Different speed adjustment solutions represent that the circles of the wiper motor rotation speed are increased or decreased per minute is different during each speed adjustment. For example, in FIG. 8, the solution 1 represents that the wiper motor rotation speed is increased or decreased 3 circles per minute during each speed adjustment, the sensitivity solution 2 represents that wiper motor rotation speed is increased or decreased 6 circles per minute during each speed adjustment, and so on. In an embodiment, the speed adjustment solution setting switch 1014 is an optional switch. The manual operation module 101 in the wiper intelligence control device may be provided with the speed adjustment solution setting switch 1014, or not.

Figure 9:
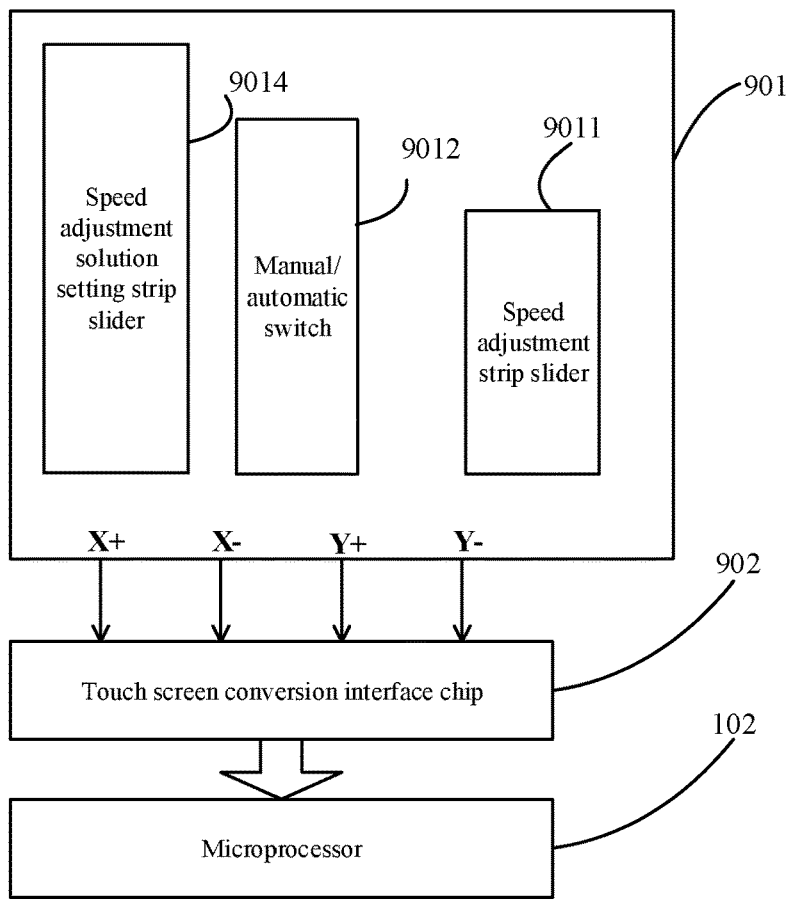
FIG. 9 is a structural diagram of a touch wiper intelligence control device according to an embodiment.

In the above embodiment, the function switches in the manual operation module 101, such as the speed adjustment switch 1011, the manual/automatic switch 1012 and the speed adjustment solution setting switch 1014, are all mechanical electrical switches. However, the wiper intelligence control device is not limited to this when implemented. The manual operation module 101 may also be designed with the touch screen technology. As shown in FIG. 9, a touch display 901 is connected to a touch screen conversion interface chip 902 through a total of four lines X+, X−, Y+ and Y−. The touch screen conversion interface chip 902 communicates with the microprocessor 102 of the wiper intelligence control device. On the touch display 901, a touch speed adjustment strip slider 9011 is set instead of the mechanical speed adjustment switch 1011, a touch manual/automatic switch 9012 is set instead of the mechanical manual/automatic switch 1012, and a speed adjustment solution setting strip slider 9014 is set instead of the mechanical speed adjustment solution setting switch 1014. In an embodiment, the speed adjustment switch 1011 and the speed adjustment solution setting switch 1014 make full use of the advantages of the touch screen technology to be designed as the form of a strip slider, but is not limited to this in the specific application, and other design forms may be adopted.

In an embodiment, the microprocessor 102 may be an STC12C2052AD single-chip. The main characteristics of the STC12C2052AD single-chip includes follows: an enhanced 8051 Central Processing Unit (CPU), 1 Terabyte (T), a single clock/machine cycle, instruction codes are fully compatible with traditional 8051; 1) an operating voltage: STC12C2052AD series operating voltage: 3.5 volt (v)–5.5 v; 2) an operating frequency range: 0-35 megahertz (MHz); 3) a driver application program space: 2 kilobytes (KB); 4) a 256-byte Random Access Memory (RAM) integrated on the chip; 5) general-purpose I/O ports (the number of the ports is 15); 6) Electrically Erasable Programmable Read Only Memory (EEPROM) function; 7) total four 16-bit timers; 8) external interrupt 9-path; 9) a PWM (2-path)/Programmable Counter Array (PCA) (2-path); 10) A/D conversion, and a 8-bit precision Analog-to-Digital Converter (ADC) with 8 paths; 11) an general-purpose full-duplex asynchronous serial port (i.e. a Universal Asynchronous Receiver Transmitter (UART)); 12) a Serial Peripheral Interface (SPI) synchronization communication port, and a master mode/slave mode. The general-purpose I/O port of the STC12C2052AD single-chip may also be used for collecting the output signal of at least one switch in the manual operation module 101, and the general-purpose I/O port of the chip may also be used for outputting the control signal. The signal of the intensity of precipitation from the rainfall sensor 103 or the signals from other sensors may be directly input the STC12C2052AD single-chip through a corresponding port. If these signals are the analogue signals, the corresponding digital signals may be obtained through the A/D port of the STC12C2052AD single-chip and after converted by the internal A/D in the STC12C2052AD single-chip. If the above sensor signals are the digital signals, the digital signals may be read through the digital input port of the STC12C2052AD single-chip. Alternatively, the signal of the intensity of precipitation from the rainfall sensor 103 or the signals from other sensors may be input a communication port corresponding to the single-chip through the bus of the vehicle, such as the LIN bus, and through the bus interface. Similarly, in the design of the wiper intelligence control, some vehicle driving reference signals influencing the wiper movement speed of the wiper may also be input the corresponding communication port of the single-chip through the bus interface. In addition, the STC12C2052AD single-chip has a PWM output port, and the output PWM signal may control the DC wiper motor rotation speed.

In an embodiment, the microprocessor 102 may be a built-in microprocessor of the intelligence control device in the present disclosure, or may be the microprocessor in the on-board control module or the control unit of the vehicle. For example, the microprocessor 102 is the processor in the BCM.

Figure 10:
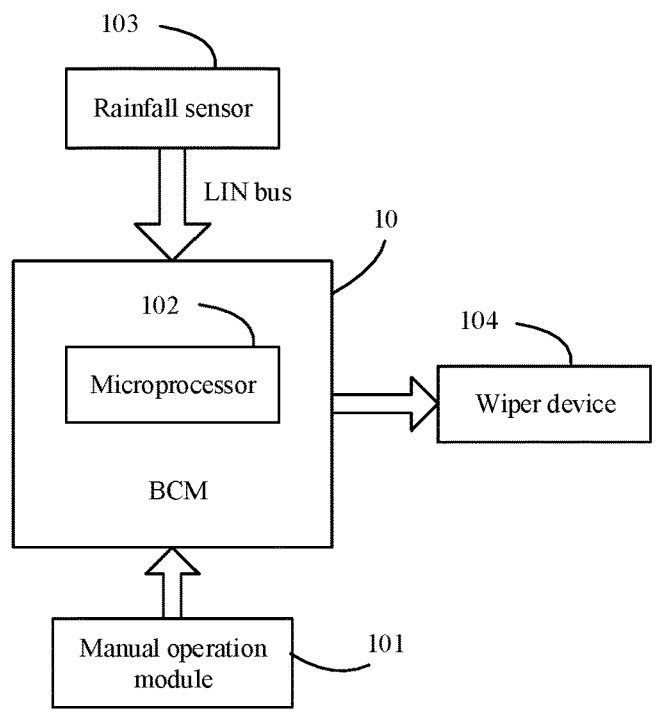
FIG. 10 is a structural diagram of a wiper intelligence control device using a microprocessor in a body control module (BCM) according to an embodiment.

In an embodiment, referring to FIG. 10, the manual operation module 101, the rainfall sensor 103 and the wiper device 104 are connected to the BCM 10. The rainfall sensor 103 is connected to the microprocessor 102 in the BCM 10 through the LIN bus. The rainfall sensor 103 transmits the sensed information of the intensity of precipitation to the microprocessor 102 in the BCM 10 through the LIN bus in real time. The microprocessor 102 in the BCM 10 receives the information of the intensity of precipitation, calculates the wiper movement speed corresponding to the information of the intensity of precipitation sensed by the rainfall sensor 102 in real time according to a preset correspondence between the intensity of precipitation and the wiper movement speed, and outputs the wiper movement speed control signal corresponding to the wiper movement speed to the wiper device 104, to enable the wiper device 104 to execute the corresponding wiping action requested by the wiper movement speed control signal. In this embodiment, the interaction processes between the microprocessor 102 in the BCM 10 and the manual operation module 101, and the rainfall sensor 103 and the wiper device 104 may be the same as that of the microprocessor 102, which are not repeated in detail herein.

In summary, in this embodiment, when the wiper intelligence control device enters into the automatic wiper operating state, the operating process is substantially as follows, which is only for understanding the present disclosure, but not limited thereto: in step 1, the microprocessor 102 inquires the signal output from the manual operation module 101, to determine whether the manual operation module 101 outputs the signal; if the manual operation module 101 outputs the signal, step 7 is executed; if the manual operation module 101 does not output the signal, step 2 is executed. The signal output from the manual operation module 101 is retained in a register of the microprocessor 102 and is not cleared until the operation requested by the signal is completed. In the step 2, the microprocessor 102 reads the data output from the rainfall sensor 103 and returns to the step 1 if the rainfall sensor 103 is not connected or fails. In step 3, the microprocessor 102 sends the control instruction to the wiper device 104 according to the intensity of precipitation sensed by the rainfall sensor 103. In step 4, the wiper device 104 establishes a stable wiper movement according to the received control instruction. In step 5, after the wiper device 104 completes a stable wiper reciprocating period, the signal output from the manual operation module 101 is queried. In step 6, the microprocessor 102 queries the signal output from the manual operation module 101, and determines whether the manual operation module 101 outputs the signal; if the manual operation module 101 outputs the signal, the step 7 is executed; if the manual operation module 101 does not output the signal, the step 2 is executed. In the step 7, the microprocessor 102 processes the signal sent by the manual operation module 101 and outputs the control instruction to the wiper device 104; the wiper device 104 correspondingly executes the speed adjustment operation, the manual/automatic switching operation or the speed adjustment resolution setting operation according to the control instruction. In this embodiment, when the wiper intelligence control device enters into the manual wiper operation state, the operating process is substantially as follows, which is only for understanding the present disclosure, but not limited thereto: in step 1, the microprocessor 102 inquires the signal output from the manual operation module 101, to determine whether the manual operation module 101 outputs the signal; if the manual operation module 101 outputs the signal, step 2 is executed; if the manual operation module 101 does not output the signal, the manual operation module 101 is waited for outputting the signal, and kept the current movement state of the wiper. The reason why the current wiper movement state is kept is that the manual wiper operation state at this moment may be switched from the automatic wiper operation state, and the current wiper movement speed is locked. The signal output from the manual operation module 101 is retained in the register of the microprocessor 102 and is not cleared until the operation requested by the signal is completed. In the step 2, the microprocessor 102 processes the signal sent by the manual operation module 101 and outputs the control instruction to the wiper device 104, and the wiper device 104 correspondingly executes the speed adjustment operation, the manual/automatic switching operation or the speed adjustment resolution setting operation according to the control instruction. In addition, in this embodiment, when the power source of the intelligence wiper control device is cut off in any state, the wiper returns to the original "zero" state after the current reciprocating period is completed, and the intelligence wiper control device returns to the original state.

The wiper intelligence control device in the above embodiments sets the corresponding wiper speed of the wiper according to the intensity of precipitation sensed by the rain sensor 103. However, in the actual driving process, if the driving information data such as the travel speed of the vehicle, the road surface roughness, and the ambient light outside the vehicle are different under the condition of the same the intensity of precipitation, the wiper speed required by the driver will also be different. Therefore, in order to improve the experience of the driver, a more reasonable wiper speed of the wiper is provided for the driver. In this embodiment, the wiper speed of the wiper may be comprehensively set according to the driving information data such as the intensity of precipitation, the travel speed of the vehicle, the road surface roughness and the ambient light outside the vehicle. The signals input by the driving information data acquisition module, such as the travel speed of the vehicle, the road surface roughness, the ambient light outside the vehicle, are similar to the signals input by the rainfall sensor 103. Both the digital quantity and the analog quantity may be read by the microprocessor 102 with the A/D port or may be read by the microprocessor 102 through the bus of the vehicle, such as the LIN bus, and through the bus interface. Therefore, a corresponding driving information data signal input module does not need to be additionally designed. But not limited to this, for different implementations of the intelligence wiper control device, a corresponding I/O module may be additionally designed as an interface between the microprocessor 102 and a vehicle data bus or other sensors.

According to the technical schemes of the present disclosure, a manual wiper adjustment function and a rainfall sense automatic wiper adjustment function are implemented in a single control device, and these two functions, the manual wiper adjustment function and the automatic wiper adjustment function, can operate interactively. That is, when the wiper operates in the automatic wiper operation state, the driver can manually adjust the wiper movement speed preset according to the intensity of precipitation until the wiper movement speed required by the driver is reached, so that the wiper movement speed can meet the current requirement of the driver and the individual difference requirements of the drivers more. Thus, the adjustment of the wiper movement speed of the wiper is more humanized. In addition, according to the technical schemes provided by the present disclosure, the current wiper movement speed in the automatic wiper operation state can be locked as the wiper movement speed of the wiper in the manual wiper operation state at any time. In addition, when the wiper operates in the manual wiper operation state, when the wiper movement speed of the wiper is not the wiper movement speed required by the driver, the driver can adjust the current wiper movement speed until the wiper movement speed required by the driver is reached. Therefore, the multi-level manual adjustment of the wiper movement speed of the wiper is implemented, the operations are simple, and the adjustment efficiency of the wiper movement speed of the wiper is improved.

The wiper system with the functions of manual wiper adjustment and rainfall sense automatic wiper adjustment is easier to be manufactured compared with the traditional wiper system, the manufacturing cost of the wiper system is reduced, and it is beneficial to wide popularization of intelligence wiper.

It will be understood by those skilled in the art that all of the above embodiments may be implemented by related hardware instructed by computer programs. These programs may be stored in a computer-readable storage medium. These programs, when executed, may include the procedures of any of above embodiments of the method. In an embodiment, the storage medium may be a magnetic disk, an optical disk, a Read-Only Memory (ROM), a RAM, or the like.

What is claimed is:

1. A wiper intelligence control method, comprising:
    switching an operation state of a wiper to an automatic wiper operation state or a manual wiper operation state according to a received wiper operation state switch signal, wherein the automatic wiper operation state refers to that a wiper movement speed of the wiper automatically changes with change of an intensity of precipitation sensed by a rainfall sensor;
    when the wiper operates in the automatic wiper operation state, in response to determining that a wiper movement speed adjustment signal output from a manual operation module is received, adjusting a current wiper movement speed according to the wiper movement speed adjustment signal;
    when the wiper is switched from the automatic wiper operation state to the manual wiper operation state, changing the wiper movement speed of the wiper in the manual wiper operation state to match the current wiper movement speed of the wiper in the automatic wiper operation state so that the wiper in the manual wiper operation state moves at the kept current wiper movement speed; and
    when the wiper operates in the manual wiper operation state, in response to determining that the wiper movement speed adjustment signal output from the manual operation module is received, adjusting the current wiper movement speed according to the wiper movement speed adjustment signal.

2. The wiper intelligence control method of claim 1, wherein in the case where the wiper operates in the automatic wiper operation state, after adjusting the current wiper movement speed according to the wiper movement speed adjustment signal, the method further comprises:
    using a correspondence between the adjusted wiper movement speed and the intensity of precipitation at a moment of receiving the wiper movement speed adjustment signal as a reference to subsequently adjust a plurality of wiper movement speeds corresponding to different intensities of precipitation.

3. The wiper intelligence control method of claim 1, wherein the wiper movement speed adjustment signal is used for instructing the wiper movement speed to be adjusted up or down;
    wherein adjusting the current wiper movement speed according to the wiper movement speed adjustment signal comprises:
        in response to determining that the wiper movement speed adjustment signal instructs the wiper movement speed to be adjusted up, increasing a wiper motor rotation speed corresponding to the current wiper movement speed by a speed variation corresponding to a default speed adjustment resolution; and in response to determining that the wiper movement speed adjustment signal instructs the wiper movement speed to be adjusted down, decreasing the wiper motor rotation speed corresponding to the current wiper movement speed by the speed variation corresponding to the default speed adjustment resolution; wherein the default speed adjustment resolution is a default speed variation of the wiper motor rotation speed.

4. The wiper intelligence control method of claim 1, wherein the wiper movement speed adjustment signal is used for instructing the wiper movement speed to be adjusted up or down;
    wherein before adjusting the current wiper movement speed according to the wiper movement speed adjustment signal, the method further comprises:
    receiving a speed adjustment resolution setting signal output from the manual operation module, and setting a speed adjustment resolution according to the speed adjustment resolution setting signal, wherein the speed adjustment resolution is a speed variation of a wiper motor rotation speed;
wherein adjusting the current wiper movement speed according to the wiper movement speed adjustment signal comprises:
    in response to determining that the wiper movement speed adjustment signal instructs the wiper movement speed to be adjusted up, increasing a wiper motor rotation speed corresponding to the current wiper movement speed by a speed variation corresponding to the set speed adjustment resolution; and in response to determining that the wiper movement speed adjustment signal instructs the wiper movement speed to be adjusted down, decreasing the wiper motor rotation speed corresponding to the current wiper movement speed by the speed variation corresponding to the set speed adjustment resolution.

5. A wiper intelligence control device, comprising a manual operation module and a microprocessor, wherein the manual operation module is connected to the microprocessor, the manual operation module is configured to output a wiper operation state switch signal to the microprocessor, the manual operation module is further configured to output a wiper movement speed adjustment signal to the microprocessor, the microprocessor is configured to be connected to a rainfall sensor and a wiper device, and the microprocessor is further configured to: switch an operation state of the wiper to an automatic wiper operation state or a manual wiper operation state according to the wiper operation state switch signal output from the manual operation module; when the wiper operates in the automatic wiper operation state, calculate a wiper movement speed corresponding to an intensity of precipitation sensed by the rainfall sensor in real time according to a preconfigured correspondence between the intensity of precipitation and the wiper movement speed, output a wiper movement speed control signal corresponding to the wiper movement speed to the wiper device, to enable the wiper device to execute a wiping action corresponding to the wiper movement speed control signal, and in response to determining that the wiper movement adjustment signal output from the manual operation module is received, adjust a current wiper movement speed according to the wiper movement speed adjustment signal, and output a wiper motor speed adjustment instruction corresponding to the adjusted wiper movement speed to the wiper device, to adjust the wiper movement speed; when the wiper is switched from the automatic wiper operation state to the manual wiper operation state, keep change the wiper movement speed of the wiper in the manual wiper operation state to match the current wiper movement speed of the wiper in the automatic wiper operation state so that the wiper in the manual wiper operation state moves at the current wiper movement speed; when the wiper operates in the manual wiper operation state, in response to determining that the wiper movement speed adjustment signal output from the manual operation module is received, adjust the current wiper movement speed according to the wiper movement speed adjustment signal, and output the wiper motor speed adjustment instruction corresponding to the adjusted wiper movement speed to the wiper device, to adjust the wiper movement speed.

6. The wiper intelligence control device of claim 5, wherein the microprocessor is further configured to, when the wiper operates in the automatic wiper operation state, after adjusting the current wiper movement speed according to the wiper movement speed adjustment signal, use a correspondence between the adjusted wiper movement speed and the intensity of precipitation at a moment of receiving the wiper movement speed adjustment signal as a reference to subsequently adjust a plurality of wiper movement speeds corresponding to different intensities of precipitation.

7. The wiper intelligence control device of claim 5, wherein the wiper movement speed adjustment signal is used for instructing the wiper movement speed to be adjusted up or down;
the microprocessor is configured to adjust the current wiper movement speed according to the wiper movement speed adjustment signal, and output the wiper motor speed adjustment instruction corresponding to the adjusted wiper movement speed to the wiper device through following manners: in response to determining that the wiper movement speed adjustment signal instructs the wiper movement speed to be adjusted up, increasing a wiper motor rotation speed corresponding to the current wiper movement speed by a speed variation corresponding to a default speed adjustment resolution, and outputting the wiper motor speed adjustment instruction corresponding to the increased wiper motor rotation speed to the wiper device; in response to determining that the wiper movement speed adjustment signal instructs the wiper movement speed to be adjusted down, decreasing the wiper motor rotation speed corresponding to the current wiper movement speed by the speed variation corresponding to the default speed adjustment resolution, and outputting the wiper motor speed adjustment instruction corresponding to the decreased wiper motor rotation speed to the wiper device; wherein the default speed adjustment resolution is a default speed variation of the wiper motor rotation speed.

8. The wiper intelligence control device of claim 5, wherein the microprocessor is further configured to receive driving information data including a travel speed of a vehicle, a road surface roughness and ambient light outside the vehicle, and set the wiper movement speed of the wiper according to the driving information data and the intensity of precipitation sensed by the rainfall sensor in real time.

9. A computer-readable storage medium, storing computer-executable instructions, wherein the computer-executable instructions are used for executing a wiper intelligence control method comprising the steps of:
switching an operation state of a wiper to an automatic wiper operation state or a manual wiper operation state according to a received wiper operation state switch signal, wherein the automatic wiper operation state refers to that a wiper movement speed of the wiper automatically changes with change of an intensity of precipitation sensed by a rainfall sensor;
when the wiper operates in the automatic wiper operation state, in response to determining that a wiper movement speed adjustment signal output from a manual operation module is received, adjusting a current wiper movement speed according to the wiper movement speed adjustment signal;
when the wiper is switched from the automatic wiper operation state to the manual wiper operation state, changing the wiper movement speed of the wiper in the manual wiper operation state to match the current wiper movement speed of the wiper in the automatic wiper operation state so that the wiper in the manual wiper operation state moves at the current wiper movement speed; and
when the wiper operates in the manual wiper operation state, in response to determining that the wiper movement speed adjustment signal output from the manual operation module is received, adjusting the current wiper movement speed according to the wiper movement speed adjustment signal.

10. The wiper intelligence control method of claim 2, wherein the wiper movement speed adjustment signal is used for instructing the wiper movement speed to be adjusted up or down;
wherein adjusting the current wiper movement speed according to the wiper movement speed adjustment signal comprises:
in response to determining that the wiper movement speed adjustment signal instructs the wiper movement speed to be adjusted up, increasing a wiper motor rotation speed corresponding to the current wiper movement speed by a speed variation corresponding to a default speed adjustment resolution; and in response to determining that the wiper movement speed adjustment signal instructs the wiper movement speed to be adjusted down, decreasing the wiper motor rotation speed corresponding to the current wiper movement speed by the speed variation corresponding to the default speed adjustment resolution; wherein the default speed adjustment resolution is a default speed variation of the wiper motor rotation speed.

11. The wiper intelligence control method of claim 2, wherein the wiper movement speed adjustment signal is used for instructing the wiper movement speed to be adjusted up or down;
　　wherein before adjusting the current wiper movement speed according to the wiper movement speed adjustment signal, the method further comprises:
　　　　receiving a speed adjustment resolution setting signal output from the manual operation module, and setting a speed adjustment resolution according to the speed adjustment resolution setting signal, wherein the speed adjustment resolution is a speed variation of a wiper motor rotation speed;
　　wherein adjusting the current wiper movement speed according to the wiper movement speed adjustment signal comprises:
　　　　in response to determining that the wiper movement speed adjustment signal instructs the wiper movement speed to be adjusted up, increasing a wiper motor rotation speed corresponding to the current wiper movement speed by a speed variation corresponding to the set speed adjustment resolution; and
　　　　in response to determining that the wiper movement speed adjustment signal instructs the wiper movement speed to be adjusted down, decreasing the wiper motor rotation speed corresponding to the current wiper movement speed by the speed variation corresponding to the set speed adjustment resolution.

12. The wiper intelligence control device of claim 6, wherein the wiper movement speed adjustment signal is used for instructing the wiper movement speed to be adjusted up or down;
　　the microprocessor is configured to adjust the current wiper movement speed according to the wiper movement speed adjustment signal, and output the wiper motor speed adjustment instruction corresponding to the adjusted wiper movement speed to the wiper device through following manners: in response to determining that the wiper movement speed adjustment signal instructs the wiper movement speed to be adjusted up, increasing a wiper motor rotation speed corresponding to the current wiper movement speed by a speed variation corresponding to a default speed adjustment resolution, and outputting the wiper motor speed adjustment instruction corresponding to the increased wiper motor rotation speed to the wiper device; in response to determining that the wiper movement speed adjustment signal instructs the wiper movement speed to be adjusted down, decreasing the wiper motor rotation speed corresponding to the current wiper movement speed by the speed variation corresponding to the default speed adjustment resolution, and outputting the wiper motor speed adjustment instruction corresponding to the decreased wiper motor rotation speed to the wiper device; wherein the default speed adjustment resolution is a default speed variation of the wiper motor rotation speed; or
　　the manual operation module is further configured to output a speed adjustment resolution setting signal to the microprocessor, the microprocessor is further configured to receive the speed adjustment resolution setting signal output from the manual operation module, and set a speed adjustment resolution according to the speed adjustment resolution setting signal, wherein the speed adjustment resolution is a speed variation of the wiper motor rotation speed; the microprocessor is configured to adjust the current wiper movement speed according to the wiper movement speed adjustment signal, and output the wiper motor speed adjustment instruction corresponding to the adjusted wiper movement speed to the wiper device through following manners: in response to determining that the wiper movement speed adjustment signal instructs the wiper movement speed to be adjusted up, increasing the wiper motor rotation speed corresponding to the current wiper movement speed by a speed variation corresponding to the set speed adjustment resolution, and outputting the wiper motor speed adjustment instruction corresponding to the increased wiper motor rotation speed to the wiper device; and in response to determining that the wiper movement speed adjustment signal instructs the wiper movement speed to be adjusted down, decreasing the wiper motor rotation speed corresponding to the current wiper movement speed by the speed variation corresponding to the set speed adjustment resolution, and outputting the wiper motor speed adjustment instruction corresponding to the decreased wiper motor rotation speed to the wiper device.

13. The wiper intelligence control device of claim 6, wherein the microprocessor is further configured to receive driving information data including a travel speed of a vehicle, a road surface roughness and ambient light outside the vehicle, and set the wiper movement speed of the wiper according to the driving information data and the intensity of precipitation sensed by the rainfall sensor in real time.

14. The wiper intelligence control device of claim 7, wherein the microprocessor is further configured to receive driving information data including a travel speed of a vehicle, a road surface roughness and ambient light outside the vehicle, and set the wiper movement speed of the wiper according to the driving information data and the intensity of precipitation sensed by the rainfall sensor in real time.

15. The wiper intelligence control device of claim 12, wherein the microprocessor is further configured to receive driving information data including a travel speed of a vehicle, a road surface roughness and ambient light outside the vehicle, and set the wiper movement speed of the wiper according to the driving information data and the intensity of precipitation sensed by the rainfall sensor in real time.

16. The wiper intelligence control device of claim 7, wherein the manual operation module is further configured to output a speed adjustment resolution setting signal to the microprocessor, the microprocessor is further configured to receive the speed adjustment resolution setting signal output from the manual operation module, and set a speed adjustment resolution according to the speed adjustment resolution setting signal, wherein the speed adjustment resolution is a speed variation of the wiper motor rotation speed; the microprocessor is configured to adjust the current wiper movement speed according to the wiper movement speed adjustment signal, and output the wiper motor speed adjustment instruction corresponding to the adjusted wiper movement speed to the wiper device through following manners: in response to determining that the wiper movement speed adjustment signal instructs the wiper movement speed to be adjusted up, increasing the wiper motor rotation speed corresponding to the current wiper movement speed by a speed variation corresponding to the set speed adjustment resolution, and outputting the wiper motor speed adjustment instruction corresponding to the increased wiper motor rotation speed to the wiper device; and in response to determining that the wiper movement speed adjustment signal instructs the wiper movement speed to be adjusted down, decreasing the wiper motor rotation speed corresponding to the current wiper movement speed by the speed variation corresponding to the set speed adjustment resolution, and outputting the wiper motor speed adjustment instruction corresponding to the decreased wiper motor rotation speed to the wiper device.

* * * * *

UNITED STATES PATENT AND TRADEMARK OFFICE
CERTIFICATE OF CORRECTION

PATENT NO. : 11,718,272 B2
APPLICATION NO. : 16/757392
DATED : August 8, 2023
INVENTOR(S) : Yu Xu It is certified that error appears in the above-identified patent and that said Letters Patent is hereby corrected as shown below:

In the Claims

Column 23, Line 57, Claim 1, delete the word "kept";

Column 25, Line 22, Claim 5, delete the word "keep"; and

Column 26, Line 16, Claim 9, insert --non-transitory-- between "A" and "computer-readable".

Signed and Sealed this
Seventeenth Day of October, 2023

Katherine Kelly Vidal
*Director of the United States Patent and Trademark Office*